United States Patent Office 2,994,682
Patented Aug. 1, 1961

2,994,682
GRAFT COPOLYMERS OF AN ALKENYL-SUBSTITUTED AROMATIC COMPOUND, AND UNSATURATED ESTER, AND A COPOLYMER OF AN ALKENYL-SUBSTITUTED AROMATIC COMPOUND AND AN UNSATURATED KETONE
Henry George Hammon, Columbus, Richard A. Clark, Worthington, and John W. Uttley, Jr., Hilliards, Ohio, assignors, by mesne assignments, to Shell Oil Company, Emeryville, Calif., a corporation of Delaware
No Drawing. Filed Oct. 29, 1958, Ser. No. 770,256
10 Claims. (Cl. 260—45.5)

This invention relates to polymeric products and a method for their preparation. More particularly, the invention relates to a new class of graft copolymers having improved clarity and unusually high impact strength.

Specifically, the invention provides new and particularly useful graft copolymers comprising the product of polymerization of (1) an alkenyl-substituted aromatic compound, (2) an ethylenically unsaturated ester, and (3) a preformed copolymer of an alkenyl-substituted aromatic compound and an ethylenically unsaturated ketone.

Conventional polystyrenes and conventional copolymers and terpolymers, containing a styrene, while useful as molding resins, do not exhibit unusually high impact strength. Some conventional, clear resins containing a styrene may exhibit somewhat higher impact strengths. However, these resins usually are soft, have low heat-distortion temperatures, and only obtain improved impact strength by sacrificing a certain amount of their other useful properties.

Because of the ready availability of styrene and substituted styrenes at favorable prices, a need exists for clear, high-impact strength, styrene molding resins that have properties superior to molding resins based on polystyrenes or conventional copolymers and terpolymers containing a styrene. Impact strength commonly obtained with polystyrene and its co- or terpolymers is in the order of 0.2 to 0.5 foot-pound per inch notch. Clear styrene-base polymers having excellent molding properties and having impact strengths greater than 0.5 foot-pound per inch constitute a significant improvement in the art.

It is, therefore, an object of the invention to provide a superior molding resin. It is a further object to provide molding resins having superior impact strength. It is a further object to provide high impact molding resins having improved clarity. It is a further object to provide new high impact molding resins which are hard and have good heat resistance. These and other objects of the invention will be apparent from the following detailed description thereof.

It has now been discovered that these and other objects may be accomplished by the new graft copolymers of the invention comprising a product of polymerization of (1) an alkenyl-substituted aromatic compound, (2) an ethylenically unsaturated ester, and (3) a preformed copolymer of an alkenyl-substituted aromatic compound and an ethylenically unsaturated ketone. It has been found that these special graft copolymers have unexpectedly superior properties, particularly as to clarity and impact strength. The new graft copolymers, for example, have impact strengths above those of conventional polystyrene and have impact strengths which in many cases go as high or higher than 1.5 ft./lb./inch notch. Surprisingly, these superior properties, such as clarity and improved impact strength, are obtained without any sacrifice in the other desired properties, such as hardness and good heat resistance.

The new copolymers of the invention are to be distinguished in structure from the conventional copolymers and terpolymers formed by polymerizing an initial mixture containing the monomers, such as the above-noted alkenyl-substituted aromatic compounds, unsaturated esters, and unsaturated ketones. In such a conventional process the resulting polymers have a random mixture of the three monomer units all along the polymer backbone chain. The new copolymers of the invention, however, have a graft structure wherein the alkenyl-substituted aromatic compound units and the ketone units make up the polymer backbone chain and polymer chains of the alkenyl-substituted aromatic compound units and unsaturated ester units are attached (grafted) at random along the side of the said polymer backbone chain. Such a structure is unique in that the backbone polymer retains its original structure and the modification is in the graft sidechains instead of the backbone polymer itself. For clarity throughout the specification and claims, the initial preformed polymer used in making the graft copolymers may be referred to as the backbone polymer and the monomers used in making the graft polymer chains will be referred to as the grafting monomers.

The preformed polymer used as the backbone polymer in the preparation of the new graft copolymers of the present invention comprises the product of polymerization of an alkenyl-substituted aromatic compound and an unsaturated ketone. The alkenyl-substituted aromatic compounds include those compounds having an alkenyl group, and preferably a 1-alkenyl group, e.g., a vinyl group, attached to a ring carbon atom of an aromatic ring. Examples of these include, among others, styrene, alpha-methylstyrene, vinyl toluene, 2-chlorostyrene, 4-chlorostyrene, 2,4-dichlorostyrene, 2,5-dichlorostyrene, vinylnaphthalene, 2-methylstyrene, 2,4-diethylstyrene, 2,3,4-trimethylstyrene, 2,4-diisobutylstyrene, 3-tert-butylstyrene, 4-octylstyrene, allylstyrene, 4-cyclohexylstyrene, and the like, and mixtures thereof. Preferred alkenyl-substituted aromatic compounds include the styrenes, such as styrene itself and the halo-substituted styrenes and styrenes substituted with a hydrocarbon radical, the substituents being on the vinyl side chain or on the aromatic ring. Particularly preferred are styrene, alpha-alkylstyrenes, and mono- and dichloro- and mono- and polyalkyl-substituted styrenes wherein the substituents are attached to ring carbon atoms, said substituted styrenes containing up to 12 carbon atoms. Coming under special consideration, particularly because of the superior properties of the resulting products as well as the ready availability and low cost is styrene itself.

The ethylenically unsaturated ketones used in making the preformed copolymers comprise those compounds having an ethylenically unsaturated radical attached to a

group. The radical containing the unsaturated group may be an ethylenically unsaturated aliphatic or cycloaliphatic radical, such as, for example, vinyl, allyl, 3-butenyl, 5-pentenyl, 3-cyclohexenyl, 2-cyclobutenyl, and the like. The other radicals attached to the ketone group may be aliphatic, cycloaliphatic, aromatic, or heterocyclic radicals. Examples of the unsaturated ketones include, among others, methyl vinyl ketone, ethyl vinyl ketone, methyl isopropenyl vinyl ketone, butyl vinyl ketone, 3-cyclohexenone, methyl allyl ketone, butyl allyl ketone, cyclohexyl allyl ketone, and phenyl allyl ketone, and the like. Especially preferred are the alkyl alkenyl ketones, dialkenyl ketones and the cycloalkyl alkenyl ketones. As the number of carbon atoms in the ketone is increased above 8, a decline in the favorable properties of the graft polymers results. Remarkably superior properties of the results are obtained, however, when the ketone contains 4 to 6 carbon atoms. Particularly superior results are obtained when the ketone is methyl isopropenyl ketone.

The amount of the unsaturated ketone in the finished preformed polymer may vary within certain limits. The amount of the ketone is small and should generally not be above 10 parts by weight per 100 parts of the preformed copolymer. Preferably, the unsaturated ketone should be between 0.5 and 10 parts and the alkenyl-substituted aromatic compound from 99.5 to 90 parts by weight aromatic compound. Best results are obtained when about 2 parts of the ketones as methyl isopropenyl ketone are used.

The preformed polymers of the alkenyl-substituted aromatic compound and the unsaturated ketones can be prepared by any suitable method. They may be prepared, for example, by polymerization in solution or in aqueous emulsion or suspension systems. They are preferably prepared by heating the monomers together in an aqueous emulsion in the presence of a free radical yielding catalyst. Examples of the preferred catalysts include, among others, per-acids as persulfuric acid, salts of peracids as potassium persulfate, peroxides as benzoyl peroxide, hydrogen peroxide, di-tertiary butyl peroxide, di-tert-butyl succinate, tert-butyl peracetate, di-tert-butyl dipermalonate, and 2,2-bis(tert-butylperoxy)butane. The amount of the catalyst employed is preferably between 0.05% to 5% by weight of the monomers to be polymerized, and still more preferably between 0.1% and 1.0% by weight thereof.

Any of the known emulsifying agents may be employed. These include particularly the ionic surface active agents, especially those having a polar structure including a hydrophilic (predominantly hydrocarbon) residue and a charged (ionic) radical thereon, such as anionic surface-active compounds including alkali metal and nitrogen-base soaps of higher fatty acids, such as potassium and/or sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, and palmityl amine hydrobromide. Additional examples of suitable ionic surface-active emulsifying agents include the alkali metal or ammonium alkyl or alkylene sulfates or sulfonates, such as sodium and/or potassium lauryl sulfate, alkyl, aryl and alkylated aryl sulfonates, cetyl sulfonate, oleyl sulfonate, stearyl sulfonate, sulfonated Turkey red oil, sulfonated mineral oils, sodium, potassium and ammonium isopropyl naphthalene sulfonate, amine soaps, such as triethanolamine stearate, amino-substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol. Starch, gum-arabic, the polyoxyalkylene oxide condensates of hexitan anhydrides, carboxymethylcellulose, etc. may also be used.

In the event products are desired which have outstanding clarity, one should employ emulsifying agents, such as tetrasodium - N - (1,2 - dicarboxyethyl) - N - octadecylsulfosuccinamate, which is commercially available under the name of Aerosol 22 as a 35 percent active solution, sodium dodecylbenzene sulfonate, which is commercially available under the trade name of Ultrawet 30, and decylbenzene sodium sulfonate, which is available under the trade name of Santomerse S. Especially preferred is Aerosol 22.

The emulsifying agents are preferably employed in amounts varying from about 0.1% to 5% by weight of the monomers to be polymerized.

The reaction is preferably conducted in an inert atmosphere, such as in the presence of nitrogen, methane, and the like.

Known modifiers, such as the mercaptans, can also be employed in the preparation of the backbone copolymers.

Preferred temperatures range from 40° C. to 150° C. Particularly preferred temperatures range from about 40° C. to 80° C. Superatmospheric, atmospheric or subatmospheric pressures may be used as desired.

The above-described backbone polymer should be retained in the original polymerization mixture, such as the aqueous latex for the subsequent grafting operation.

The monomers to be copolymerized with the above-described backbone polymer comprising the alkenyl-substituted aromatic compounds and the ethylenically unsaturated esters. The alkenyl-substituted aromatic compounds employed may be any of those described above for the preparation of the backbone copolymer, such as, for example, styrene, alpha-methylstyrene, vinyl toluene, 2-chlorostyrene, 4-chlorostyrene, 2,4 - dichlorostyrene, vinylnaphthalene, 2-methylstyrene, 2,4 - diethylstyrene, 2,3,4-trimethylstyrene, 4-cyclohexylstyrene, and the like, and mixtures thereof. The alkenyl-substituted aromatic compound selected preferably is but need not be the same as the alkenyl-substituted aromatic compound used in the preparation of the backbone copolymer. Particularly preferred alkenyl-substituted aromatic compounds include the styrenes, such as styrene itself and the halo- and hydrocarbyl-substituted styrenes wherein the substituent is placed on the vinyl side chain or the aromatic ring. Especially preferred are the above-noted styrenes containing no more than 12 carbon atoms.

The unsaturated ester to be used in preparing the new graft copolymers comprise the monomeric organic esters possessing at least one

group and at least one carbon-to-carbon unsaturated linkage as an ethylenic linkage. A preferred group of the unsaturated esters comprise the esters of ethylenically unsaturated monocarboxylic acids and monohydric alcohols. Examples of this group comprise, among others, methyl methacrylate, ethyl methacrylate, butyl methacrylate, ethyl acrylate, isopropyl acrylate, cyclohexyl acrylate, allyl acrylate, allyl methacrylate, octyl acrylate, octenyl methacrylate, butyl crotonate, cyclohexyl crotonate, and the like. Another preferred group of unsaturated esters comprise the esters of ethylenically unsaturated monocarboxylic acids and polyhydric alcohols, such as, for example, ethylene glycol diacrylate, ethylene glycol dimethylacrylate, butylene glycol dicrotonate, hexylene glycol diacrylate, ethylene glycol acrylate methacrylate and cyclohexenediol diacrylate. Another preferred group comprise the esters of saturated aliphatic or cycloaliphatic monohydric alcohols and unsaturated polycarboxylic acids, such as, for example, diethyl maleate, dibutyl fumarate, dibutyl 3-butenedioic acid and the like. Also useful, but less preferred are the esters of ethylenically unsaturated alcohols and monocarboxylic acids, such as allyl acetate, allyl butyrate, allyl propionate, allyl cyclohexanecarboxylate and the like.

Especially preferred are the esters of the ethylenically unsaturated aliphatic and cycloaliphatic monocarboxylic acids containing from 3 to 10 carbon atoms and the saturated aliphatic and cycloaliphatic monohydric alcohols containing from 1 to 10 carbon atoms, and the esters of the aforedescribed monocarboxylic acids and saturated aliphatic and cycloalphatic di- and trihydric alcohols containing from 2 to 10 carbon atoms. Particularly superior results are obtained when the unsaturated ester contains from 8 to 12 carbon atoms. Ethyl acrylate is especially preferred.

The ratio in which the alkenyl-substituted aromatic compounds and the unsaturated ester are used in preparing the graft copolymer may vary within certain limits. The alkenyl-substituted aromatic compound and the unsaturated ester may be employed in ratios varying from 2.5:1 to 4:1. The best properties in the graft polymer are obtained when the ratio of the alkenyl-substituted aromatic compounds to the ester is about 3:1.

The total amount of the grafting monomers to be used in preparing the new graft copolymers will vary from about 40 to 70 parts of such monomers to 60 to 30 parts of the above-described backbone polymer. In a preferred embodiment of the invention, the grafting monomers constitute about 60 parts by weight and the backbone copolymer comprises about 40 parts by weight. In such a preferred embodiment, the unsaturated ketone units are present in only relatively small proportions. However, the presence of a relatively small amount of the unsaturated ketone in the backbone of the copolymer and consequently present in the final graft polymer yields unexpectedly superior impact strength.

The graft polymer of the invention is prepared by adding the above-desired grafting monomers to the polymerization medium containing the preformed polymer and then continuing the polymerization. In the preferred procedure, the desired monomers are added all at once or in small increments to the medium containing the above-described preformed polymer and the mixture heated in an inert atmosphere.

In some cases, it may be desirable to add additional emulsifying agent and additional free radical yielding catalysts, such as those described above to speed the formation of the graft. Such catalysts are generally added in amounts varying from about 0.1% to 4% by weight.

The monomers may be added all at one time or one or more of the monomers may be added in small increments or continuously throughout the reaction.

If an emulsion agent is added, it is preferably an agent as tetrasodium-N-(1,2-dicarboxyethyl)-N-octadecylsulfosuccinate, sodium dodecyl benzene sulfonate, and decyl benzene sodium sulfonate. Especially preferred is the above-described Aerosol 22. Such agents are preferably employed in amounts varying from about .5% to 5% by weight of the monomer and polymer being polymerized.

Temperatures employed in the formation of the graft will vary depending upon the rate desired, catalyst selected and the like. Preferred temperatures range from about 40° C. to about 150° C. The rate of grafting generally goes up as the temperature is increased. Particularly preferred temperatures to be used as desired.

The grafting process is accomplished in the absence of molecular oxygen. This is preferably accomplished by conducting the reaction in the presence of an inert gas, such as nitrogen, methane and the like.

At the conclusion of the reaction, i.e., when substantially all of the monomer has been consumed, the graft copolymer can be recovered from the reaction mixture by any suitable method such as freezing, precipitation, extraction, filtration and the like. In the case of aqueous emulsion systems, the copolymer is preferably removed by freezing and thawing or by coagulation with alcohols and the like.

The graft copolymers prepared by the above process are soft to hard solids having molecular weights ranging from about 5,000 to about 150,000 as determined by the light scattering technique as described in Chem. Rev., vol. 40, page 319 (1940). The copolymers may be molded in conventional injection and compression molding techniques to form valuable molded articles. The copolymers are particularly suited for use in preparing articles, such as drinking tumblers, dishes, and food covers and the like. They should also prove useful in lens systems where the optical requirements are not stringent, for example, in tail-light covers on automobiles. Other uses will be obvious to those skilled in the art.

The following examples more specifically describe a preferred manner in which the invention may be practiced and illustrate certain of its advantages and the benefits to be obtained therefrom. In the examples all parts are by weight, and impact strengths are in foot-pounds, per inch, notch, determined in accordance with ASTM D256–54T, ⅛-inch bar.

Example I

This example illustrates the preparation and properties of a graft copolymer from styrene and ethyl acrylate and a preformed copolymer of styrene and methyl isopropenyl ketone.

A heavy-walled glass container was used as the reaction vessel in which to perform the polymerization. A water solution of tetra-sodium-N-(1,2-dicarboxyethyl)-N-octadecylsulfosuccinamate was prepared, containing 1.5 parts of the emulsifier and 180 parts of water. The pH of this solution was adjusted to 10 by the addition of 10 percent sodium hydroxide solution. The following mixture was then placed in a glass container:

| Ingredients: | Parts by weight |
|---|---|
| Water | 180 |
| Tetra-sodium-N-(1,2-dicarboxyethyl)-N-octadecylsulfosuccinamate | 1.5 |
| Ammonium persulfate | 1 |
| Tertiary-dodecyl mercaptan | 0.1 |
| Styrene | 38 |
| Methyl isopropenyl ketone | 2 |

Air was removed from the container by purging with nitrogen. The container was closed with a self-sealing cap, and the container was then placed in a rack and rotated end-over-end in a thermostatically controlled water bath set at 50° C. The reaction was run to completion in about three hours. The copolymer so formed serves as the base polymer, or backbone, for formation of the graft polymer.

For the grafting portion of the polymerization, 45 parts by weight of styrene and 15 parts by weight of ethyl acrylate were added to the reaction chamber containing the backbone copolymer. The reaction vessel was then replaced in the water bath and polymerization allowed to continue at 50° C. The grafting phase of the reaction ran substantially to completion in an additional 3½ hours. The polymer was then coagulated by freezing, thawing and filtering.

The graft polymer formed was clear and exhibited an impact strength of 1.55.

Example II

Following the procedure of Example I, 45 parts of styrene and 15 parts of ethyl acrylate were grafted upon a copolymer backbone consisting essentially of 35 parts of styrene and 5 parts of methyl isopropenyl ketone. The polymerization temperature was 50° C. The graft polymer thus prepared was clear and exhibited an impact strength of 1.0.

Example III

Following the procedure of Example I, 45 parts of styrene and 15 parts of dibutyl fumarate were grafted upon a copolymer backbone consisting essentially of 38 parts of styrene and 2 parts of methyl isopropenyl ketone. The polymerization temperature was 65° C. and 1.5 parts of tetra-sodium-N-(1,2-dicarboxyethyl)-N-octadecylsulfosuccinamate were used as the emulsifier. This polymer exhibited an impact strength of 0.76 and was clear.

Example IV

If methyl styrene, ethyl styrene, dimethyl styrene, or mixtures thereof are used in place of all, or part, of the styrene in the preceding examples, there will be obtained graft polymers having impact strengths equal, or superior, to conventional polystyrenes.

Example V

When methyl acrylate, ethyl methacrylate, methyl methacrylate, ethylene glycol diacrylate, or mixtures thereof, are used in place of all, or part, of the ethyl acrylate in the grafting portion of the polymers of the preceding examples, there will be obtained graft polymers having impact strengths equal, or superior, to conventional polystyrenes.

Example VI

Related results are also obtained by replacing the methyl isopropenyl ketone in Examples I to V with equal amounts by weight of each of the following: methyl vinyl ketone, cyclohexyl vinyl ketone, butyl isopropenyl ketone and amyl isopropenyl ketone.

Example VII

Using emulsion-polymerization techniques, a terpolymer consisting essentially of 83 parts of styrene, 15 parts of methyl isopropenyl ketone, and 2 parts of ethyl acrylate was prepared. This terpolymer exhibited an impact strength of 0.47.

Example VIII

Using emulsion-polymerization techniques, a copolymer consisting essentially of 85 parts of styrene and 15 parts of methyl isopropenyl ketone was prepared. This copolymer exhibited an impact strength of 0.48.

It is to be noted that Examples VII and VIII are not intended to be illustrative of polymers prepared by this invention, since they describe the preparation of a terpolymer and a copolymer. They are inserted to provide comparative data and thus to forcefully illustrate the superior properties, such as impact strength, attained in the graft polymers of this invention.

It is obvious from the above description and examples that later modifications can be made without departing from the spirit and scope of the invention. It is intended that all such modifications should be included hereunder.

We claim as our invention:

1. A graft copolymer composition comprising the product of polymerization of (1) styrene, (2) an alkyl alkenoate containing up to 12 carbon atoms, the amount of (1) and (2) making up 40 to 70 parts by weight and 60 to 30 parts by weight of (3) a preformed copolymer of styrene and an alkyl alkenyl ketone containing from 4 to 8 carbon atoms, the styrene defined in (1) and the alkyl alkenoate ester of (2) being combined in a weight ratio of 2.5:1 to 4:1.

2. A graft copolymer as in claim 1 wherein the alkyl alkenoate is ethyl acrylate.

3. A graft copolymer as in claim 1 wherein the alkyl alkenyl ketone is methyl isopropenyl ketone.

4. A graft copolymer as in claim 1 wherein the alkyl alkenyl ketone is methyl vinyl ketone.

5. A graft copolymer composition comprising the product of polymerization of (1) 45 parts of styrene, (2) 15 parts by weight of ethyl acrylate, and (3) a preformed copolymer of 38 parts by weight of styrene and 2 parts by weight of methyl isopropenyl ketone.

6. A graft copolymer composition comprising the product of polymerization of (1) 45 parts by weight of styrene, (2) 15 parts by weight of dibutyl fumarate, and (3) a preformed copolymer of 38 parts by weight of styrene and 2 parts by weight of methyl isopropenyl ketone.

7. A graft copolymer composition comprising the product of polymerization of (1) an alkenyl-substituted aromatic compound selected from the group consisting of styrene, alpha-alkylstyrenes, and the mono- and dichloro- and mono- and polyalkyl-substituted styrenes wherein the substituents are attached to ring carbon atoms, said substituted styrenes containing up to 12 carbon atoms, (2) an ethylenically unsaturated carboxylic acid ester containing up to 12 carbon atoms and selected from the group consisting of (A) an ester of a saturated monohydric alcohol and an ethylenically unsaturated monocarboxylic acid and (B) an ester of a saturated monohydric alcohol and an ethylenically unsaturated dicarboxylic acid, and (3) a preformed copolymer of (1) and an ethylenically unsaturated ketone selected from the group consisting of alkyl, alkenyl ketones, dialkenyl ketones and cycloalkyl alkenyl ketones.

8. A graft copolymer composition comprising the product of polymerization of (1) an alkenyl-substituted aromatic compound selected from the group consisting of styrene, alpha-alkylstyrenes, and the mono- and dichloro- and mono- and polyalkyl-substituted styrenes wherein the substituents are attached to ring carbon atoms, said substituted styrenes containing up to 12 carbon atoms, (2) an ethylenically unsaturated carboxylic acid ester containing up to 12 carbon atoms and selected from the group consisting of (A) an ester of a saturated monohydric alcohol and an ethylenically unsaturated monocarboxylic acid and (B) an ester of a saturated monohydric alcohol and an ethylenically unsaturated dicarboxylic acid, and (3) a preformed copolymer of (1) and an ethylenically unsaturated ketone selected from the group consisting of alkyl alkenyl ketones, dialkenyl ketones and cycloalkyl alkenyl ketones, the amount of (1) and (2) making up from 40 to 70 parts and the amount of (3) making up 60 to 30 parts by weight of the polymerizable mixture.

9. A graft copolymer composition as in claim 8 wherein the unsaturated ester is dibutyl fumarate.

10. A graft copolymer composition comprising the product of polymerization of (1) styrene, (2) an ethylenically unsaturated carboxylic acid ester containing up to 12 carbon atoms and selected from the group consisting of (A) an ester of a saturated monohydric alcohol and an ethylenically unsaturated monocarboxylic acid and (B) an ester of a saturated monohydric alcohol and an ethylenically unsaturated dicarboxylic acid, and (3) a preformed copolymer of 1 to 10 parts of an alkyl alkenyl ketone and 99 to 90 parts of styrene, the amount of (1) and (2) making up from 40 to 70 parts and the amount of (3) making up 60 to 30 parts by weight of the polymerizable mixture.

References Cited in the file of this patent

UNITED STATES PATENTS 1,937,063    Meisenberg             Nov. 28, 1933